US012572330B2

(12) United States Patent
Dangi et al.

(10) Patent No.: US 12,572,330 B2
(45) Date of Patent: Mar. 10, 2026

(54) ENHANCEMENTS TO DATAGEN ALGORITHM TO GAIN ADDITIONAL PERFORMANCE

(71) Applicant: Dell Products L.P., Round Rock, TX (US)

(72) Inventors: Salil Dangi, Mission Viejo, CA (US); Eugene Kim, Irvine, CA (US); Amol Powar, Burlington (CA)

(73) Assignee: Dell Products L.P., Round Rock, TX (US)

( * ) Notice: Subject to any disclaimer, the term of this patent is extended or adjusted under 35 U.S.C. 154(b) by 1083 days.

(21) Appl. No.: 17/648,777

(22) Filed: Jan. 24, 2022

(65) Prior Publication Data

US 2023/0236798 A1      Jul. 27, 2023

(51) Int. Cl.
*G06F 7/58*          (2006.01)
(52) U.S. Cl.
CPC ................................... *G06F 7/582* (2013.01)
(58) Field of Classification Search
CPC ............... G06F 16/174; G06F 16/1748; G06F 16/2455; G06F 7/582
See application file for complete search history.

(56) References Cited

U.S. PATENT DOCUMENTS

| | | | |
|---|---|---|---|
| 3,680,056 A | 7/1972 | Kropfl | |
| 6,307,938 B1 | 10/2001 | Matyas et al. | |
| 6,430,732 B1 | 8/2002 | Hwang et al. | |
| 6,816,093 B1 | 11/2004 | Jaquette | |
| 8,112,802 B2 | 2/2012 | Hadjieleftheriou et al. | |
| 8,223,673 B2 | 7/2012 | Miriyala et al. | |
| 8,290,150 B2 | 10/2012 | Erhart et al. | |
| 8,638,926 B2 | 1/2014 | Schneider | |
| 8,660,994 B2 | 2/2014 | Slater et al. | |
| 9,152,545 B1 | 10/2015 | Vonthenen | |

(Continued)

FOREIGN PATENT DOCUMENTS

| | | |
|---|---|---|
| CN | 103098016 A | 5/2013 |
| CN | 104272263 A | 1/2015 |

(Continued)

OTHER PUBLICATIONS

AWS, "What is an API?", Amazon AWS, Dec. 14, 2021. https://aws.amazon.com/what-is/api (Year: 2021).*

(Continued)

*Primary Examiner* — Nicholas Klicos
*Assistant Examiner* — Jonathan David Warner
(74) *Attorney, Agent, or Firm* — Workman Nydegger

(57)          ABSTRACT

One example method includes receiving, from a caller, a call for a data stream of a specified size, initializing the data stream by specifying a first prime number and a second prime number, both of which may be 32-bit primes, and by specifying an available amount of data. The method further includes generating data of the data stream using the first prime number and the second prime number, and transmitting the data of the data stream to the caller until either the data stream has fulfilled the call, or until the available amount of data becomes zero. During the transmitting, the (Continued)

method includes maintaining a running counter that starts at the available amount of data, and decrementing the counter by the amount of data sent to the caller.

18 Claims, 7 Drawing Sheets

(56) References Cited

U.S. PATENT DOCUMENTS

| | | | |
|---|---|---|---|
| 10,038,733 B1 | 7/2018 | Dangi et al. | |
| 10,114,832 B1 | 10/2018 | Dangi et al. | |
| 10,114,850 B1 | 10/2018 | Dangi et al. | |
| 10,163,371 B1 | 12/2018 | Dangi et al. | |
| 10,235,134 B1 | 3/2019 | Dangi et al. | |
| 10,638,150 B1 | 4/2020 | Dangi et al. | |
| 10,939,132 B2 | 3/2021 | Dangi et al. | |
| 10,997,053 B2 | 5/2021 | Dangi et al. | |
| 11,283,863 B1 | 3/2022 | Cleaver et al. | |
| 11,748,316 B2 | 9/2023 | Dangi et al. | |
| 2001/0055311 A1 | 12/2001 | Trachewsky et al. | |
| 2005/0132123 A1 | 6/2005 | Glaum et al. | |
| 2005/0192994 A1 | 9/2005 | Caldwell et al. | |
| 2006/0150229 A1 | 7/2006 | Blair et al. | |
| 2006/0161702 A1 | 7/2006 | Bowlby et al. | |
| 2008/0005429 A1* | 1/2008 | Ludwig | G06F 13/385 |
| | | | 710/68 |
| 2008/0133891 A1 | 6/2008 | Salz et al. | |
| 2008/0140971 A1 | 6/2008 | Dankel et al. | |
| 2008/0162421 A1 | 7/2008 | Brooks | |
| 2010/0017436 A1 | 1/2010 | Wolge | |
| 2010/0138587 A1 | 6/2010 | Hutson | |
| 2011/0119432 A1 | 5/2011 | Yoon | |
| 2011/0299581 A1 | 12/2011 | Le-Gall | |
| 2012/0016839 A1 | 1/2012 | Yueh | |
| 2012/0114310 A1 | 5/2012 | Hymel et al. | |
| 2012/0233135 A1 | 9/2012 | Tofano | |
| 2012/0233417 A1* | 9/2012 | Kalach | G06F 11/1453 |
| | | | 711/E12.103 |
| 2013/0226881 A1 | 8/2013 | Sharma et al. | |
| 2013/0308589 A1 | 11/2013 | Liu et al. | |
| 2013/0346703 A1 | 12/2013 | Mccauley et al. | |
| 2014/0118541 A1 | 5/2014 | Lasko | |
| 2014/0279874 A1 | 9/2014 | Reiter et al. | |
| 2016/0103757 A1 | 4/2016 | Liu et al. | |
| 2016/0316049 A1 | 10/2016 | Byrne et al. | |
| 2017/0220593 A1 | 8/2017 | Tripathy et al. | |
| 2018/0309815 A1 | 10/2018 | Dangi et al. | |
| 2019/0034450 A1 | 1/2019 | Dangi et al. | |
| 2019/0042590 A1 | 2/2019 | Dangi et al. | |
| 2020/0029096 A1 | 1/2020 | Rusanovskyy | |
| 2020/0034243 A1 | 1/2020 | Venkatesan et al. | |
| 2020/0334215 A1 | 10/2020 | Dangi et al. | |
| 2022/0164510 A1 | 5/2022 | Reid et al. | |
| 2022/0391333 A1 | 12/2022 | Veluswamy et al. | |
| 2023/0048922 A1* | 2/2023 | Mori | G06F 21/72 |
| 2023/0072477 A1 | 3/2023 | Dangi | |
| 2023/0236965 A1 | 7/2023 | Dangi et al. | |
| 2024/0314704 A1 | 9/2024 | Li et al. | |

FOREIGN PATENT DOCUMENTS

| | | | |
|---|---|---|---|
| CN | 106067892 A | 11/2016 | |
| WO | 2016/137203 A1 | 9/2016 | |

OTHER PUBLICATIONS

"Data Compression/Evaluating Compression Effectiveness" internet article, Feb. 21, 2017, XP002796742, accessed on Jan. 9, 2020 via: https//en.wikibooks.org/w/index.php?title=Data_Compression/Evaluating_Compression_Effectiveness&oldid=3184899.

Adams, Philip A. & John C. Hax, "A Case for Database Filesystems", Space Mission Challenges for IT 2009 Conference, Lawrence Livermore National Laboratory, LLNL-CONF-413253, 8 pages. (Year: 2009).

International Preliminary Report on Patentability received for PCT Patent Application No. PCT/US2019/053878, mailed on Oct. 28, 2021, 8 pages.

International Preliminary Report on Patentability received for PCT Patent Application No. PCT/US2019/066619, mailed on Oct. 28, 2021, 10 pages.

International Search Report and Written Opinion for PCT/US2019/053878 mailed Jan. 31, 2020.

International Search Report and Written Opinion issued in Application No. PCT/US2019/066632.

International Search Report and Written Opinion received for PCT Patent Application No. PCT/US19/066619, mailed on Jun. 23, 2020, 18 pages.

U.S. Appl. filed Apr. 19, 2019, Dangi et al., U.S. Appl. No. 16/389,741.

U.S. Application Filed on Apr. 19, 2019, by Dangi et al., U.S. Appl. No. 16/389,671.

U.S. Application Filed on Apr. 19, 2019, by Dangi et al., U.S. Appl. No. 16/389,700.

U.S. Application Filed on Apr. 19, 2019, by Dangi et al., U.S. Appl. No. 16/389,729.

U.S. Application Filed on Dec. 25, 2018, by Dangi et al., U.S. Appl. No. 10/163,371.

U.S. Application Filed on Jul. 31, 2018, by Dangi et al., U.S. Appl. No. 10/038,733.

U.S. Application Filed on Mar. 19, 2018, by Dangi et al., U.S. Appl. No. 10/235,134.

U.S. Application Filed on Oct. 30, 2018, by Dangi et al., U.S. Appl. No. 10/114,832.

U.S. Application Filed on Oct. 30, 2018, by Dangi et al., U.S. Appl. No. 10/114,850.

Universal Mobile Telecommunications System; Multiplexing and channel coding; Technical Specification, European Telecommunications Standards Institute Sophia Antipolis Cedex. France, vol. 3-R1, No. V7.3.0 Dec. 1, 2006, XP014036328.

Author Unknown, Mac Performance Guide, Understanding Compressible vs. Incompressible Data, May 6, 2012, macperformanceguide.com/SSD-incompressible-vs-compressible-data.html, p. 1.

Bach, Matt, Puget Systems, SSDs: Advertised vs. Actual Performance, Jan. 25, 2013, pugetsystems.com/labs/articles/SSDs-Advertised-vs-Actual-Performance-179/, p. 1-2.

Jonathan, "How to flip a specific bit in a byte in C?", Oct. 27, 2013, Stack Overflow (Year: 2013).

Murty, M. Ram, Prime Numbers and Irreducible Polynomials, May 2002, The Mathematical Association of America, Monthly 109, p. 452.

Weisstein, Eric W., Goldbach Conjecture, Jun. 7, 2000, mathworld.wolfram.com/goldbachconjecture.html, p. 1.

* cited by examiner

100 {
```
[00142] Output accumulator1
[00143] Output accumulator2
[00144] Set accumulator1 = accumulator1 + prime1
[00145] Set accumulator2 = accumulator2 + prime2
```

FIG. 1A

150 {
```
var seed, prime1, prime2, accumulator1, accumulator2;

func DGInit(seed) { accumulator1 = accumulator2 = seed; } func DGStream8(requestedCount) {
    loop for requestedCount {
        output accumulator1;
        output accumulator2;
        accumulator1 += prime1;
        accumulator2 += prime2;
    } // done requestedCount
}
```

FIG. 1B

```
var seed, prime1, prime2, accumulator1, accumulator2;

func DGInit (seed) { accumulator1 = accumulator2 = seed; } func DGStream8(requestedCount) {
        loop for requestedCount {
                output accumulator1;
                output accumulator2;
                accumulator1 += prime1;
                accumulator2 += prime2;
                if (accumulator1 == accumulator2) {
                    prime1 = nextDGprime (1, prime1);
                }
        } // done requestedCount
    }
```

300

```
var seed, prime1, prime2, accumulator1, accumulator2;
var availableCount;

func DGInit (seed) {
    accumulator1 = accumulator2 = seed;
    available = 2**32; // iterations where each one gives 8 bytes
} func DGStream8 (requestedCount) {
    loop for requestedCount {
        var intermediateCount = min (requestedCount, availableCount);
        availableCount -= intermediateCount;
        requestedCount -= intermediateCount;

loop for intermediateCount {
            output accumulator1;
            output accumulator2;
            accumulator1 += prime1;
            accumulator2 += prime2;
        } // done intermediateCount if (availableCount == 0) {
            prime1      = nextDGprime (1, prime1);
            availableCount = 2**32; // iterations
        }

} // done requestedCount
}
```

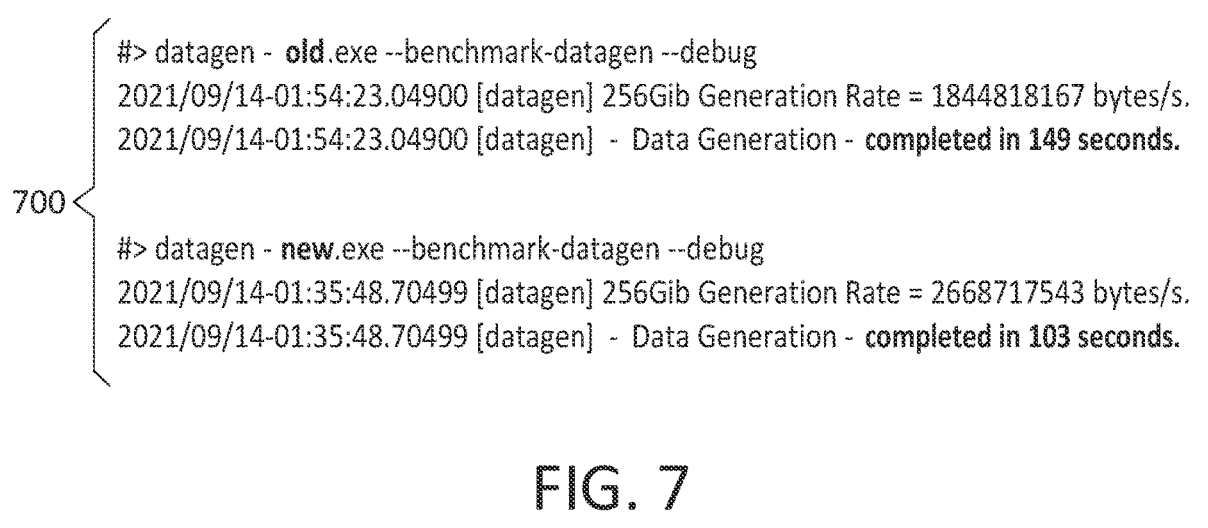

> datagen - old.exe --benchmark-datagen --debug
2021/09/14-01:54:23.04900 [datagen] 256Gib Generation Rate = 1844818167 bytes/s.
2021/09/14-01:54:23.04900 [datagen]  -  Data Generation - completed in 149 seconds.

> datagen - new.exe --benchmark-datagen --debug
2021/09/14-01:35:48.70499 [datagen] 256Gib Generation Rate = 2668717543 bytes/s.
2021/09/14-01:35:48.70499 [datagen]  -  Data Generation - completed in 103 seconds.

FIG. 7

ENHANCEMENTS TO DATAGEN ALGORITHM TO GAIN ADDITIONAL PERFORMANCE

RELATED APPLICATIONS

This application is related to U.S. Pat. No. 10,114,850, Ser. No. 14/489,295 (Data stream Generation Using Prime Numbers) (the "'850 Patent"), and U.S. Pat. No. 10,038,733, Ser. No. 14/489,317 (Generating A Large, Non-Compressible Data Stream) (the "'733 Patent"), both of which are incorporated herein in their respective entireties by this reference.

FIELD OF THE INVENTION

Embodiments of the present invention generally relate to generation of data streams. More particularly, at least some embodiments of the invention relate to systems, hardware, software, computer-readable media, and methods for improving the efficiency of data stream generation by substantially reducing the need to perform checks of how many addition operations have been performed.

BACKGROUND

Some conventional approaches to data stream generation generally involve the use of a seed value, selected from an address space of N bits, and one or more prime numbers, to generate a set of unique values that together comprise the data stream. In general, the size of the data stream that can be generated in this way may be a function of the size N of the address space. For example, a data stream generated based on an address space of N=32 bits would have a size of $2^{}N$ or $2^{}32$, that is, 4 billion unique values.

This example data stream may be generated by adding a selected prime number to the seed value to generate the next value after the seed value. This process may continue until $2^{}32$ values have been generated. Thus, generation of this example data stream would involve $2^{}32$ addition operations, each of which results in a respective one of the unique values.

Because a caller who is requesting the data stream, such as for testing purposes for example, may need a data stream that does not have any duplicate or repeating values, checks must be performed during the data stream generation to ensure that the data stream does not repeat. This means that each time an addition is performed, that is, a prime number is added to the preceding value in the data stream to generate a new value, a check must also be performed to ensure that the total number of additions has not exceeded $2^{}32$. Thus, in this example, $2^{}32$ checks must be performed during the course of the generation of the data stream.

While the performance of these checks may help to prevent a value in the data stream from being repeated, the performance of such a large number of checks imposes processing overhead on the data stream generation process. As a result, the data stream generation process may be slowed down considerably, and the performance of testing and other processes reliant on the data stream may be impacted when an even higher rate than what this algorithm currently provides is desired.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 1*a* discloses basic operations for data stream generation using two prime numbers.

FIG. 1*b* discloses example pseudocode for implementing data stream generation using the parameters of FIG. 1*a*.

FIG. 5 discloses example pseudocode for implementing data generation that significantly reduces execution of checks which determine if the process is about to repeat the data stream.

FIG. 7 discloses example results achieved with an embodiment of the invention.

DETAILED DESCRIPTION OF SOME EXAMPLE EMBODIMENTS

Figures 2, 3:
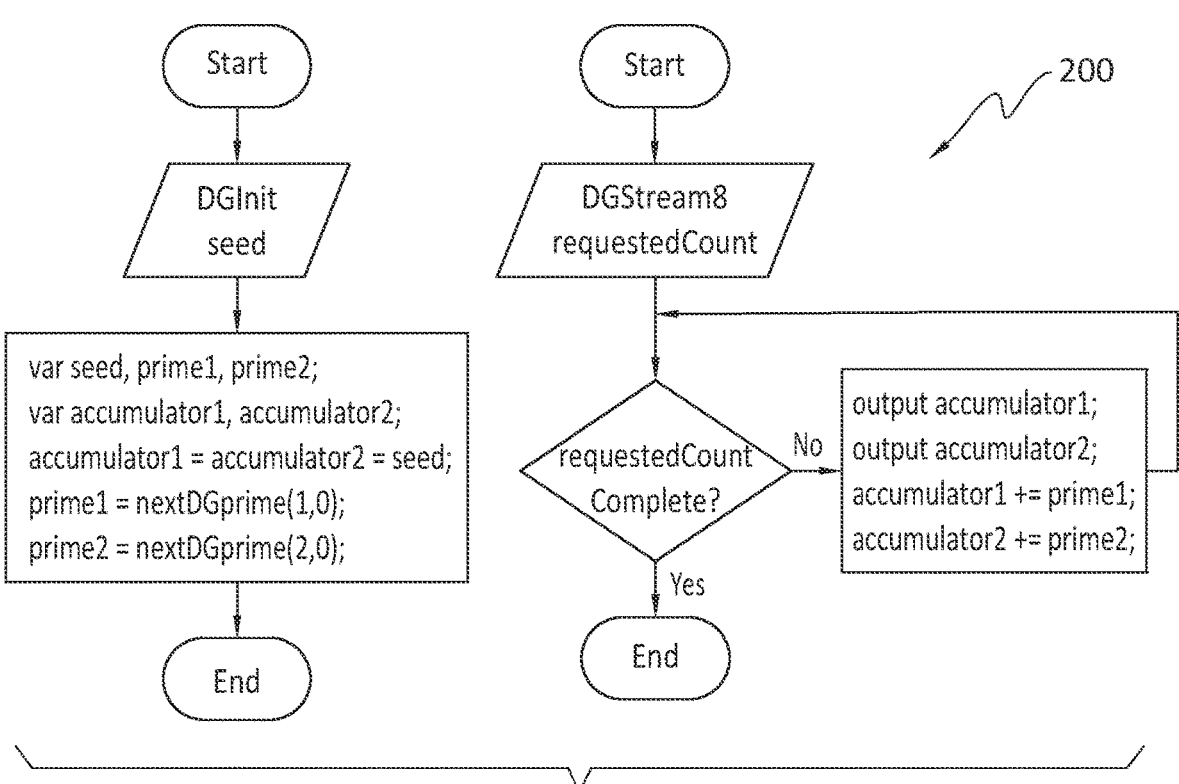
FIG. 2 discloses an example algorithm that uses two constrained prime numbers and basic cumulative add operations on a given seed to generate a data stream.
FIG. 3 discloses example pseudocode for automatically altering a prime used for the first sequence (prime1) to a new value when data repetition is about to occur.

Embodiments of the present invention generally relate to generation of data streams. More particularly, at least some embodiments of the invention relate to systems, hardware, software, computer-readable media, and methods for improving the efficiency of data stream generation by substantially reducing the need to perform a check of how many addition operations have been performed.

In general, one example of the invention may specify a value for an 'availableCount' parameter which indicates the number of remaining cycles, or loops, or iterations, of data generation which do not require validation, that is, which do not require a check to be performed to determine if the data stream is about to be repeated. An initial value for the 'availableCount' parameter may be set to $2^{**}N$, where N is the bit size of the address space that is being used for the generation of the data stream. An embodiment may also specify a value for an 'intermediateCount' parameter which indicates a maximum count, possibly an intermediate maximum count, of data values which can be returned by a data stream generator to a caller without requiring the data stream generator to select a new constrained prime for generation of additional data stream values.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may generate a data stream more quickly than would be the case if a check had to be performed each time an addition operation was performed. An embodiment may help to avoid the need for the use of relatively complex 64-bit primes in data stream generation. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The '850 Patent discloses data stream generation using prime numbers using the approach 100 set forth in FIG. 1*a*. This approach may be expressed, at a high level, with the pseudocode 150 shown in FIG. 1*b*. The pseudocode in FIG. 1*b* employs the following variable/definitions:

func DGInit—a function which seeds the data stream;

func DGStream8—a function which generates stream data in multiples of 8 bytes; and loop for requestedCount—repeats operations until the requestedCount value is met.

With reference next to FIG. 2, an algorithm 200 according to the '850 Patent is disclosed. The algorithm 200 depends on two constrained prime numbers and basic cumulative add operations on a given seed. The '850 Patent discloses the following selection enhancement in response to the issue of repetition when data generation exceeds 32 GiB of data:

Let each value of a sequence be represented by 64 bits. Therefore, let N=64 (instead of N=32).

Where N=64, a generated data stream will not repeat for approximately $2*2**64$ unsigned integers of 64-bit size or $8*2*(2**64)$ bytes≈256 exabytes.

Further to the '733 Patent however, the selected primes are required to be constrained primes to not allow compressibility:

Put another way, the component byte values of a prime number p of N=32 bits can be represented as p3p2p1p0 and p would be identified as a constrained prime number if each of p0, p1, p2, and p3 is a prime number in the range 0 to 255 (including "1" and excluding "2") and none of p0, p1, p2, and p3 were duplicates.

Thus, the enhancement proposed in the '850 Patent provides challenges since 64-bit primes may need to be calculated and constrained as taught by the '733 Patent, in order to generate a non-compressible data stream. However, selection of two primes in a 64-bit address space which meet the criteria set forth in the '733 Patent may be a complex process. To reduce this complexity, 32-bit values may instead be utilized for seed, prime1, prime2, accumulator1 and accumulator2 (see FIGS. 1*a*, 1*b*, and 2). Note that while 8-bit and 16-bit values could be used, those values would likely result in the generation of only short data streams that may not be particularly useful in some contexts.

The '850 Patent further discloses the following selection enhancement in response to the issue of data value repetition when data generation exceeds 32 GiB of This enhancement automatically alters the prime used for the first sequence (prime)) to a newvalue when the repetition is about to occur.

This enhancement allows for a very large sequence to be built as long as we have a prime number available.

This approach may result in an implementation which can be expressed in the pseudocode 300 that is disclosed in FIG. 3. With reference to the pseudocode 300, the following variable/definitions:

func DGStream8—a function that generates and streams data in multiples of 8 bytes; and nextDGprime(primeType, primeNumber)—returns a prime number of the given prime type that is higher than the specified prime number and of specific prime properties, such as the new higher prime number may be constrained.

Figure 4:
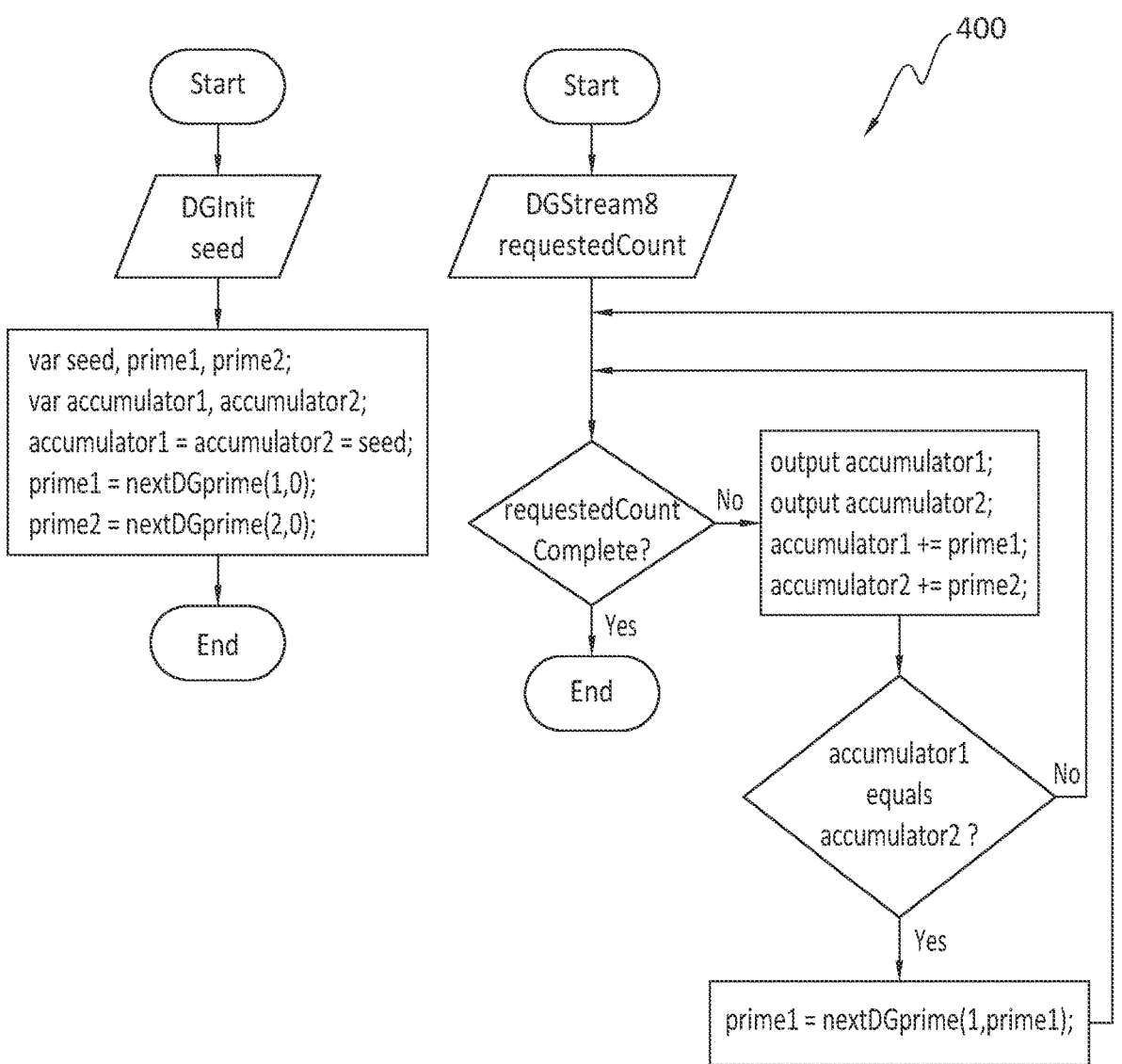
FIG. 4 discloses an example algorithm corresponding to the pseudocode of FIG. 3.

An example algorithm 400 for implementing the pseudocode 300 is disclosed in FIG. 4.

In more detail, with reference to the algorithm 400, the prime1 value is altered after the algorithm has cycled through 4 billion ($232$) times. There is no need to keep a count of cycles through the loop. Rather, it is known that the algorithm 400 has gone through a complete cycle of 4 billion addition operations if the accumulator1 value is the same value as accumulator2 value (which will also be same as the seed value), although a check must be performed each cycle to determine if the accumulator1 value is equal to the accumulator2 value. The method embodied by the algorithm 400 may be effective in certain circumstances, and can generate long data sequences since after each 32 billion bytes, the algorithm 400** can switch to a new value for prime1 and begin a new set of 4 billion cycles.

A problem, however, with the approach embodied in the algorithm 400 concerns cases where the primes prime1 and prime2, each 32 bits, are used to generate data for a data stream by adding each of these primes to their respective preceding cumulative values. In such cases, a total of 64 bits, or 8 bytes, are generated each cycle of the algorithm 400. In this scenario, a check must be performed for each cycle of the algorithm 400 to determine if the algorithm 400 has finished the 4 billion ($232$) additions or not, that is, the addition operations that are used to create new data values by adding a prime number to the preceding data value. As discussed below, example embodiments of the invention may significantly reduce the number of checks that need to be performed. For example, where a 32-bit address space is being used, the number of checks to be performed during a data generation operation may be reduced from 4 billion (as in the case of the '850 Patent for example) to only a single check for the case of requestedCount equaling 232 data units, each of 8 bytes in size.

B. Aspects of Some Example Embodiments

In general, at least some example embodiments are directed to circumstances under which high-speed data generation is required and enhance generation logic in each iteration. In such circumstances, a requestor for data generation may request a larger chunk of data stream, such as in KBs, MBs, GBs, or more, for example, and not simply in bytes.

As noted earlier, once the primes prime1/prime2 (see, e.g., the '850 Patent) are properly selected, each iteration of the algorithm generates two values. On a 32-bit implementation, where prime1/prime2 are each 32 bits, there are a total of 64 bits, or 8 bytes. Performing iterative addition operations by adding prime1 and prime2 to prior respective data values, and ignoring any overflow condition, the algorithm will repeat the original seed values exactly after doing 2**N additions. At this point, a change would have to be made to the prime1 prime and a new set of data values generated using the new prime1 prime. If prime1 is not changed, the same sequence of 32 GiB would simply be repeated. When the data generation process is streaming 8 bytes at a time, this check, that is, the check as to how many addition operations have been performed, needs to be performed for each generation of 8 bytes, that is, each cycle of the data generation algorithm.

However, in circumstances where the required output of the data stream may be much larger, which may be the case for data that runs at a rate of 2+GBPS for example, embodiments of the invention may maintain a running counter that starts with 4 billion (0x0001 0000 0000) of 8 byte data units 'availableCount,' and is decremented by the amount of such data units that are transmitted to the caller, rather than being decremented each time that 8 bytes are generated. Even if a caller were to repetitively ask, using a series of calls, for a smaller quantity like 8 KiB (1024 data units of 8 byte each), which may not be a likely scenario since callers typically ask for much larger amounts of data, example embodiments may only perform 1 check for each 8 KiB, for a total of 4 million (0x0040 0000) checks before a change of prime1. As noted elsewhere herein, a conventional approach would require 4 billion checks, so in this example, embodiments may operate to decrease the number of checks by a factor of ~1000. With reference now to FIG. 5, an algorithm 500 is disclosed that is executable to implement the aforementioned process that uses a running counter that references an 'availableCount' amount of 8 byte data units.

In FIG. 5, the following variables/definitions are used:
availableCount—number of remaining cycles which do not require validation. As an example, initial value may be set to 2**32; and
intermediateCount—intermediate maximum count which can be returned without selecting a new datagen constrained prime.

Figure 6:
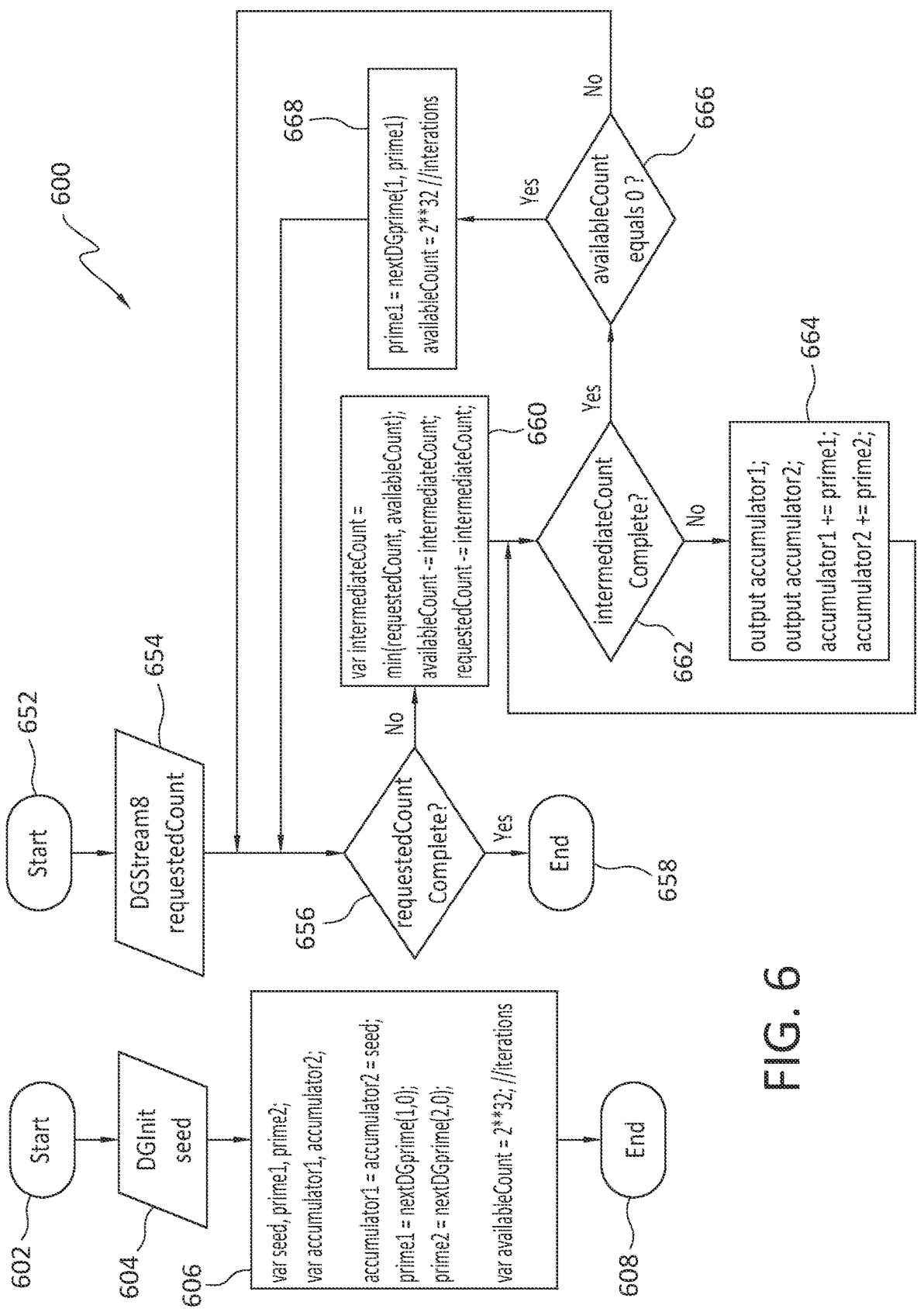
FIG. 6 discloses an algorithm that corresponds to the pseudocode of FIG. 5.

With reference next to FIG. 6, details are provided concerning example methods 600 and 650 according to some embodiments. In at least some instances the methods 600 and 650 may implement the example algorithm 500. The methods 600 and/or 650 may be performed by an entity, such as a quality assurance server, that includes a data stream generator engine. Some examples of a quality assurance server, and data stream generator engine, are disclosed in the '850 Patent. The methods 600 and/or 650 may be performed in response to a request from a caller requesting a data stream for testing and/or other purposes.

The example method 600 may start 602 with performing the DGInit Seed function 604 to seed a data stream. Some example data stream seeding processes are disclosed in the '850 Patent. The DGInit Seed function 604 may specify, and initialize, variables that will be used in a data stream generation process. For example, and as shown at 606 in FIG. 6, the following variables and initial values may be specified prior to the generation of a data stream according to some example embodiments of the
var seed, prime1, prime2; and
var accumulator1, accumulator2;
As well, the following initial, and other, values may be assigned at 606:
accumulator1=accumulator2=seed;
prime1=nextDGprime (1, 0);
prime2=nextDGprime (2, 0); and
var availableCount=2**32; //iterations
Note that the specified value for the variable 'availableCount' is provided only by way of example, and is not intended to limit the scope of the invention in any way. That value could be greater, or less, than 4 billion. Finally, the method 600 may terminate 608 after the variables and initial values have been specified. At any time after termination 608, the data stream generation method 650 may be run.

The method 650 may start 652 when a call is received 654 for a data stream to be generated and send to a caller. As shown, the call may specify a value for the requestedCount variable which specifies an amount of data to be generated and streamed to the caller. In the illustrated example, the stream data may be generated in multiples of 8 bytes, per the function DGStream8. However, it is not required that the data be generated in multiples of 8 bytes and, in other examples, the stream data may be generated in multiples less, or greater, than 8 bytes.

At 656, a determination may be made as to whether or not the amount of data specified by the requestedCount has been sent to the caller. If so, the method 650 may terminate at 658. On the other hand, if it is determined 656 that the requestedCount is not yet complete, and there is still additional data that must be sent to the caller, the method 650 may advance to 660.

At 660, the requestedCount, which may take the form of a counter, may be decremented by the next amount of data sent to the caller, which may be 8 bytes for example, and the updated value of requestedCount indicates the amount of data, if any, still required by the caller after the 8 bytes, or other amount, has been sent. Correspondingly, the availableCount amount of 8 byte data units, which may take the form of a counter, may also be decremented by 1 (representing 8 bytes), or other amount, to reflect the fact that the amount of available data has now been reduced by the amount of data that has been sent to the caller.

The intermediateCount, which is the maximum count which can still be returned without needing to select a new prime, can then be set, at 660, to the lesser of the availableCount and the requestedCount. Thus, in some circumstances, the availableCount may be greater than the requestedCount, that is, some data may still be available after the request of the caller has been fulfilled. In this case, the intermediateCount may be considered as complete once the requestedCount becomes zero because no more data is required by the caller. In other circumstances, the requestedCount may be greater than the availableCount, that is, there is not enough data remaining to service the request by the caller. In this case, the intermediateCount may be considered as complete once the availableCount becomes zero because there is no more data available to be sent to the client, and more data must be generated, using a new prime, to finish fulfilling the requestedCount.

After the counters have been decremented at 660, the method 650 may then perform a check 662 to determine if the intermediateCount has been completed. If not, additional data may be generated 664, and method 650 returns the flow back to 662. Otherwise, the method may advance to 666 where a check may be performed to determine if the available data equals zero. If there is data still available, the method 650 may return to 656. If there is no remaining data, that is, the data is about to repeat, the method 650 may advance to 668 where a new prime is assigned, and the data availability reset to 32 GiB, for example, 2**32, or 4 billion 8 byte data units.

With reference now to the example performance data 700 disclosed in FIG. 7, it can be seen that example embodiments may operate to generate data streams at a rate higher than what was previously possible due, at least in part, to elimination of the need to perform a check each time an amount of data, such as 8 bytes for example, is generated and sent. In the particular test reflected in FIG. 7, the performance, expressed in terms of time to completion, has improved by approximately 30%. That is, the runtime has been reduced from 149 seconds to 103 seconds for the generation of 256 GiB of data.

C. Aspects of Some Example Use Cases

In some embodiments, an amount of data requested by a caller may be generated without ever requiring the use of a new prime to generate additional data. In other cases however, the caller may request more data, such as more than 32 GiB for example, than can be provided without having to change any primes. In this case, example methods according to some embodiments may comprise a first operation in which all the data up to the 32 GiB limit, or other specified limit, will be provided to the caller, after which a second operation may be performed in which a value of one of the primes, such as prime1, is changed so that up to an additional 32 GiB of data can be provided, as needed by the caller. This approach may be performed as often as needed until all the requested data has been sent to the caller. Following are some illustrative examples.

C.1 Example 1

Suppose that a caller initializes the data stream and executes the following set of data calls: get(8 GiB); get(40 GiB); get(8 GiB); and, get(40 GiB). When converted to 8 byte units, these calls become DGStream8(0x0000 4000 0000); DGStream8(0x0001 4000 0000); DGStream8 (0x0000 4000 0000); and DGStream8(0x0001 4000 0000). Initially, and assuming the illustrative case where up to 32 GiB of data can be generated without requiring modification of a prime, 32 GiB may be available, so there is no difficulty servicing a call for 8 GiB. After that call has been serviced, there is 24 GiB remaining (32-8) so availableCount may be changed to 0x0000 C000 0000 to reflect 24 GiB data availability.

However, suppose further that the caller wants 40 GiB. In this case, the remaining 24 GiB will not be adequate to service that call. Thus, embodiments may split the 40 GiB call into two parts, namely, 24 GiB+16 GiB. First, the 24 GiB may be sent to the caller. Next, the value of the prime, such as prime1, may be changed, and the availableCount reset to 2**32 (0x 0001 0000 0000) data units or 32 GiB. Now, 16 GiB of the available 32 GiB may be sent to the caller, thus completing the 40 GiB requested by the caller, and the availableCount changed to 0x 0000 8000 0000 data units or 16 GiB of data availability.

Since the next call is for 8 GiB, and there is 16 GiB of data availability is shown via availableCount of 0x0000 08000 0000, the 8 GiB may be sent to the caller, and the availableCount changed to 0x000 4000 0000 to reflect 8 GiB of data availability. The final call is for 40 GiB, but there is only 8 GiB available. Thus, another split will be needed in this case. Accordingly, first the remaining 8 GiB may be sent to the caller, the prime prime1 changed, and the availableCount set to 0x0001 0000 0000 to reflect 32 GiB of data availability based on the use of the new prime1 value. Because the caller still needs 32 GiB (40-8) additional, the availableCount 0x0001 0000 0000 reflecting 32 GiB of data availability, is utilized to send 32 GiB to the caller, thus fulfilling the request. Since the availableCount is now zero, the prime prime1 may be changed again, and the availableCount again set to 2**32 (0x0001 0000 0000) to reflect data availability of 32 GiB.

C.2 Example 2

Suppose that a caller initializes the data stream and executes the following example set of data calls: get(40 GiB); get(80 GiB); and, get(40 GiB). When converted to 8 byte units, these calls become DGStream8(0x0001 4000 0000); DGStream8(0x0002 8000 0000); and DGStream8 (0x0001 4000 0000).

Initially, availableCount is 0x0001 0000 0000), reflecting 32 GiB of data availability, but the caller wants 40 GiB, so the call may be split internally, that is, within a data generation engine or other system, into two parts, thus 32 GiB+8 GiB. Next, the 32 GiB may be sent to the caller, which reduces availableCount to zero. Next the prime prime1 may be changed, and availableCount becomes 2**32, reflecting 32 GiB of data availability again. 8 GiB of the 32 GiB data availability may now be sent to the caller, and availableCount changed to 0x0000 C000 0000 to reflect 24 GiB of data availability.

While availableCount of 0x0000 C000 0000 is reflecting data availability of 24 GiB, the next call requires 80 GiB, so the call may be split. In one example, the 80 GiB call may be split into two parts, namely, 24 GiB+56 GiB. First, the 24 GiB may be sent. Next, the prime prime1 may be changed, and availableCount set again to 0x0001 0000 0000 reflecting data availability of 32 GiB. Since 56 GiB still needs to be sent, the call be may split again into two parts, namely, 32 GiB+24 GiB. The 32 GiB may be sent to the caller, prime1 changed, and availableCount set again to 0x0001 0000 0000 reflecting data availability of 32 GiB. Finally, the remaining 24 GiB that was requested may be sent, and availableCount changed to 0x0000 4000 0000 reflecting data availability of 8 GiB. This completes the processing of the 80 GiB call.

As 8 GiB is available, but the caller wants 40 GiB, the call may be split thus 8 GiB+32 GiB, and the 8 GiB given to the caller, so that availableCount becomes zero. Next, prime1 may be changed, and availableCount changed again to 0x0001 0000 0000 to reflect data availability of 32 GiB. The request for 32 GiB may be fulfilled by sending the 32 GiB which, again, results in an availableCount of zero. Thus, prime1 may be changed, and availableCount again set to 0x0001 0000 0000 reflecting data availability of 32 GiB.

In a final example, a caller may repetitively ask for the same amount, such as for example. In such a case, embodiments may perform one check on availableCount for each 1 MiB and, finally, change prime1 after 32768 calls of 1 MiB each.

D. Example Methods

It is noted with respect to the example methods disclosed in the Figure, and elsewhere herein, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: receiving, from a caller, a call for a data stream of a specified size; initializing the data stream by specifying a first prime number and a second prime number, and by specifying an available amount of data; generating data of the data stream using the first prime number and the second prime number; transmitting the data of the data stream to the caller until either: the data stream has fulfilled the call; or until the available amount of data becomes zero; and during the transmitting, maintaining a running counter that starts at the available amount of data, and decrementing the counter by the amount of data sent to the caller.

Embodiment 2. The method as recited in embodiment 1, wherein when (1) the available amount of data becomes zero, and (2) the specified size of the call exceeds an amount of data that has been sent to the caller, the method further comprises changing one of the prime numbers, setting the available amount of data to the specified available amount, and generating additional data using the prime number that was changed.

Embodiment 3. The method as recited in embodiment 2, wherein the method is repeated until the call has been fulfilled.

Embodiment 4. The method as recited in any of embodiments 1-3, wherein the available amount of data is an amount of data that can be generated using the first prime number and the second prime number without repeating any data.

Embodiment 5. The method as recited in any of embodiments 1-4, wherein when the specified size of the call is less than the available amount of data, and when all the data required by the call has been sent to the caller, the available amount is updated to a new available amount that comprises a difference between (1) the available amount specified at the initializing and (2) the amount of data required by the call.

Embodiment 6. The method as recited in any of embodiments 1-5, wherein the available amount of data specified at the initializing is a function of a 32-bit address space that is used to generate data of the data stream.

Embodiment 7. The method as recited in any of embodiments 1-6, wherein the data stream is generated relatively faster than would be the case if a check of available data were performed each time a discrete portion of the data stream was generated.

Embodiment 8. The method as recited in embodiment 7, wherein the datastream is generated in discrete portions of 8 bytes each.

Embodiment 9. The method as recited in any of embodiments 1-8, wherein the initializing further comprises specifying a seed value.

Embodiment 10. The method as recited in any of embodiments 1-9, wherein the first prime number is a 32-bit prime number, and the second prime number is a 32-bit prime number.

Embodiment 11. A system for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1 through 10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
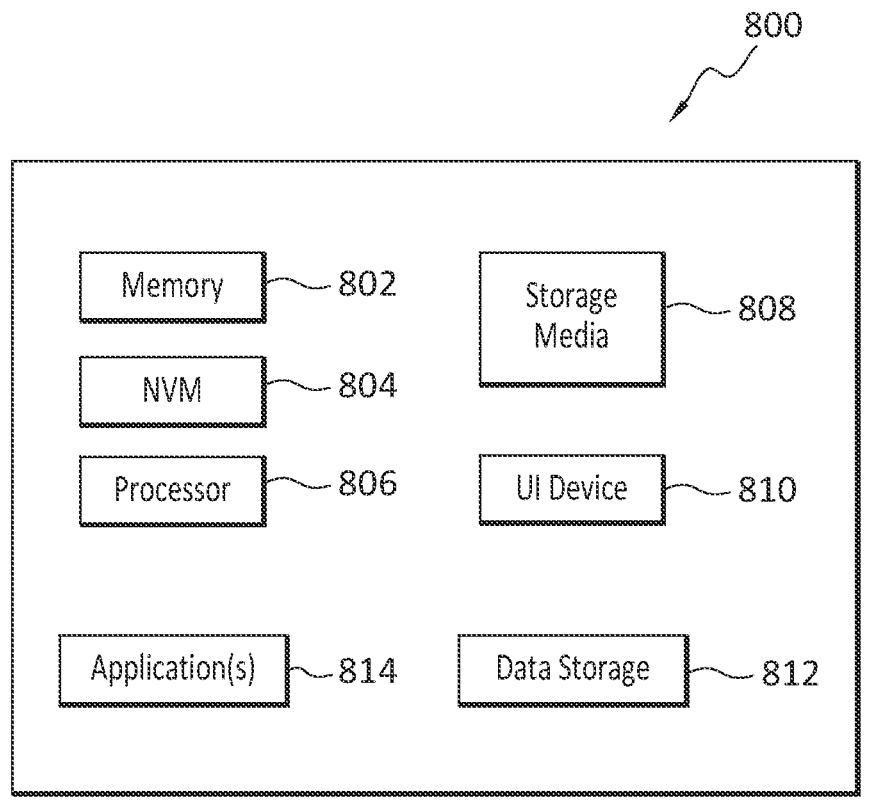
FIG. 8 discloses an example computing entity that is operable to perform any of the disclosed methods, processes, and operations.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, from a caller, a call for a data stream of a specified size;
initializing the data stream by specifying a first prime number and a second prime number, and by specifying an available amount of data;
generating data of the data stream using the first prime number and the second prime number;
transmitting the data of the data stream to the caller until either:
the data stream has fulfilled the call; or
until the available amount of data becomes zero; and
during the transmitting, maintaining a running counter that starts at the available amount of data, and decrementing the counter by the amount of data sent to the caller, and wherein the data stream is generated relatively faster than would be the case if a check of available data were performed each time a discrete portion of the data stream was generated.

2. The method as recited in claim 1, wherein when (1) the available amount of data becomes zero, and (2) the specified size of the call exceeds an amount of data that has been sent to the caller, the method further comprises changing one of the prime numbers, setting the available amount of data to the specified available amount, and generating additional data using the prime number that was changed.

3. The method as recited in claim 2, wherein the method is repeated until the call has been fulfilled.

4. The method as recited in claim 1, wherein the available amount of data is an amount of data that can be generated using the first prime number and the second prime number without repeating any data.

5. The method as recited in claim 1, wherein when the specified size of the call is less than the available amount of data, and when all the data required by the call has been sent to the caller, the available amount is updated to a new available amount that comprises a difference between (1) the available amount specified at the initializing and (2) the amount of data required by the call.

6. The method as recited in claim 1, wherein the available amount of data specified at the initializing is a function of a 32-bit address space that is used to generate data of the data stream.

7. The method as recited in claim 1, wherein the datastream is generated in discrete portions of 8 bytes each.

8. The method as recited in claim 1, wherein the initializing further comprises specifying a seed value.

9. The method as recited in claim 1, wherein the first prime number is a 32-bit prime number, and the second prime number is a 32-bit prime number.

10. A non-transitory storage medium having stored therein instructions that are executable by one or more hardware processors to perform operations comprising:

receiving, from a caller, a call for a data stream of a specified size;

initializing the data stream by specifying a first prime number and a second prime number, and by specifying an available amount of data;

generating data of the data stream using the first prime number and the second prime number;

transmitting the data of the data stream to the caller until either:

the data stream has fulfilled the call; or until the available amount of data becomes zero; and during the transmitting, maintaining a running counter that starts at the available amount of data, and decrementing the counter by the amount of data sent to the caller, and wherein the data stream is generated relatively faster than would be the case if a check of available data were performed each time a discrete portion of the data stream was generated.

11. The non-transitory storage medium as recited in claim 10, wherein when (1) the available amount of data becomes zero, and (2) the specified size of the call exceeds an amount of data that has been sent to the caller, the operations further comprise changing one of the prime numbers, setting the available amount of data to the specified available amount, and generating additional data using the prime number that was changed.

12. The non-transitory storage medium as recited in claim 11, wherein the operations are repeated until the call has been fulfilled.

13. The non-transitory storage medium as recited in claim 10, wherein the available amount of data is an amount of data that can be generated using the first prime number and the second prime number without repeating any data.

14. The non-transitory storage medium as recited in claim 10, wherein when the specified size of the call is less than the available amount of data, and when all the data required by the call has been sent to the caller, the available amount is updated to a new available amount that comprises a difference between (1) the available amount specified at the initializing and (2) the amount of data required by the call.

15. The non-transitory storage medium as recited in claim 10, wherein the available amount of data specified at the initializing is a function of a 32-bit address space that is used to generate data of the data stream.

16. The non-transitory storage medium as recited in claim 10, wherein the datastream is generated in discrete portions of 8 bytes each.

17. The non-transitory storage medium as recited in claim 10, wherein the initializing further comprises specifying a seed value.

18. The non-transitory storage medium as recited in claim 10, wherein the first prime number is a 32-bit prime number, and the second prime number is a 32-bit prime number.

* * * * *